UNITED STATES PATENT OFFICE.

CORNELIUS D. VREELAND, OF CHICAGO HEIGHTS, ILLINOIS.

PIGMENT AND PAINT COMPOSITION.

SPECIFICATION forming part of Letters Patent No. 691,422, dated January 21, 1902.

Application filed August 14, 1900. Renewed December 12, 1901. Serial No. 85,666. (No specimens.)

*To all whom it may concern:*

Be it known that I, CORNELIUS D. VREELAND, a citizen of the United States, residing at Chicago Heights, in the county of Cook, in the State of Illinois, have invented a new and useful Improvement in Compositions of Matter; and I do hereby declare that the following is a full, clear, and exact description of the same.

This invention relates to the utilization of the waste product which results from the manufacture of sulfate of alumina from bauxite. This latter material is composed of hydroxid of alumina, with more or less oxid of iron, titanium, silica, and the like. In the acid process aforesaid the bauxite ore is first treated with dilute sulfuric acid. The solution of sulfate of alumina thus produced is then allowed to settle and then filtered. From this results a precipitate prior to filtration and a residue which is caught and retained by the filter. This residue may be added to the precipitate, as for the purposes of my invention it differs from the latter in no essential degree. I include each material in the general term "sludge," which when freed from acid either by washing with water or by neutralization by means of an alkali is the material from which the paint comprised in my invention is made.

In the practice of my invention I take the sludge resulting from the hereinbefore-mentioned acid process of manufacturing sulfate of alumina (which said sulfate is commercially known by various names—for example, as "paper-makers' alum," "filter alum," "concentrated alum," "alum cake," &c.) and eliminate therefrom its acid constituents either by sufficiently profuse washing with water or by treating the material with milk of lime. This latter results in the production of some sulfate of lime, the presence of which, however, in the material does no harm. The neutralization of the acid constituents of the sludge also results in the decomposition of whatever sulfate of alumina may have remained in the sludge and causes it to be deposited in gelatinous form. This when dried with the rest of the material forms, to such extent as may be, an element thereof. In whatever manner the acid constituents of the sludge are eliminated from the latter the sludge after elimination is brought to a greater or less condition of dryness, meaning thereby a condition in which it may be readily incorporated or ground with other material—as, for example, for the production of paint. It will be observed that by the treatment described the character of the original sludge is entirely changed from that of a semiliquid and waste product of no known utility to that of a dry, neutral, pulverulent, or powdered material adapted for immediate use in various arts and industries. The drying may be accomplished by any suitable means. This neutral and dried sludge is made pulverulent or powdered in any suitable way. For the manufacture of paint the neutral and dried sludge is ground in oil in an ordinary paint-mill or in any other suitable manner, and being thus intimately incorporated with the oil constitutes an excellent paint, which may receive various tints or colors by the addition of suitable pigments' or coloring-matter. I thus by my said invention produce a paint of excellent character from a material that has hitherto been waste and commonly regarded as worthless.

What I claim as my invention is—

1. As a new article of manufacture, the herein-described dry, neutral, pulverulent or powdered product obtained from the sludge resulting from the production of sulfate of alumina by the acid process, as set forth.

2. As a new article of manufacture a paint composed of dried neutral sludge derived from the production of sulfate of alumina by the acid process, ground in oil, substantially as herein set forth.

CORNELIUS D. VREELAND.

Witnesses:
DANIEL S. DECKER,
JAMES A. WHITNEY.